(No Model.)
P. PRYIBIL.
Circular Sawing Machine.
No. 228,218.            Patented June 1, 1880.
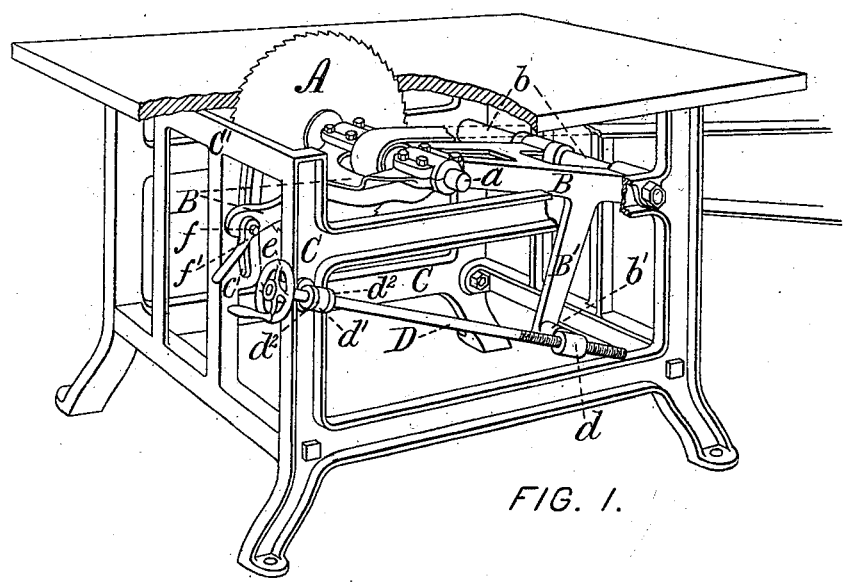
FIG. 1.
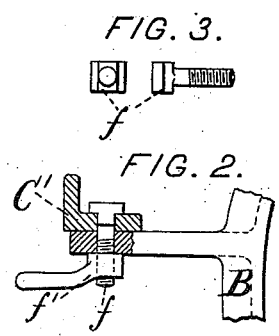
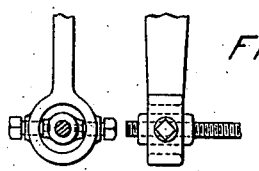
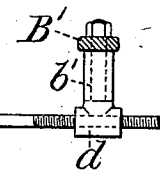
WITNESSES:          INVENTOR:
Edward D. Mackintosh        Paul Pryibil

UNITED STATES PATENT OFFICE.

PAUL PRYIBIL, OF NEW YORK, N. Y.

CIRCULAR SAWING MACHINE.

SPECIFICATION forming part of Letters Patent No. 228,218, dated June 1, 1880.

Application filed April 7, 1880. (No model.)

*To all whom it may concern:*

Be it known that I, PAUL PRYIBIL, of New York, in the county and State of New York, have invented certain new and useful Improvements in Circular Sawing Machines, of which the following is a full, clear, and exact description.

The object of my invention is to provide means whereby the vertical adjustment of circular saws can be easily and accurately accomplished, it being found in practice that a circular saw produces its smoothest and best work when its top edge in just perceptibly higher than the piece being sawed. Vertical adjustment also renders circular saws applicable to grooving.

Referring now to the accompanying drawings, forming part of this specification, and to the letters of reference marked thereon, Figure 1 is a perspective view of a machine provided with my improvements; Fig. 2, a top plan of the front end of the frame B, partly in section, showing the arrangement of clamping-screw; Fig. 3, an end and a side view of the clamping-screw; Fig. 4, a top plan of the adjusting-screw and its connections; Fig. 5, two views of a modification of one of the parts.

Like parts are marked with the same letter of reference throughout the different views.

At A is the saw, mounted in the usual manner upon the mandrel $a$, running in bearings on the frame B, which is hung upon the shaft $b$, fixed between the side frame, C C.

The frame B is provided with an arm, B', the lower end of which takes the form of a long bearing, $b'$, extending beyond the outside of the side frame. Through this bearing extends the loosely-fitted shank of the nut $d$, fitting the threaded portion of the rod D. This rod extends through the stud $d'$, bolted to the side frame, C, and has fixed upon it the collars $d^2 d^2$ and the hand-wheel $e$.

The operation is as follows: The rod D being revolved by means of the hand-wheel, the nut $d$ is traveled thereon, causing the arm B' and frame B to swing upon the shaft $b$ as a center, the saw being thereby elevated or depressed, as may be desired, the nut $d$ oscillating relatively to the arm B' as the angle of the said arm and the rod D varies. When the saw has been thus brought to the proper height relatively to the table supported by the frames C C C', the frame B is secured against further movement and against trembling or yielding by being clamped, by means of the screw $f$ and nut $f'$, to the end frame, C'. As the frame B swings upon the shaft $b$ the screw $f$ travels in the slot $c$, in which it is kept from turning when the nut $f'$ is operated by the rectangular part of its shank directly under its head, which is shown clearly in Figs. 2 and 3.

I do not confine myself to the exact construction and arrangement of the oscillating nut $d$ described above, for, without departing from my invention, the nut may be connected to the arm by hanging between pivots, as shown in the two views at Fig. 5, the arrangement of the other parts of the machine in different manner making sometimes the one form and sometimes the other preferable.

The necessity of making the stud $d'$ also capable of oscillating is obviated by making the hole in it through which the rod D extends slightly larger than the rod itself, and by setting the collars $d^2 d^2$ so that they shall not confine it too closely.

I am aware that swinging saw-frames provided with a clamp substantially like that used by me are not new; also, that they have been operated by worms working in worm-wheels or sectors fixed directly to, or communicating indirectly with, the said frames; but I am not aware that such frames have ever before been operated by the lever screw-rod and oscillating nut described above. Therefore

I claim as new and desire to secure by Letters Patent—

1. In combination with the table of a sawing-machine, a swinging circular-saw frame, B, an arm, B', provided with an oscillating nut, and a screw-rod, D, and a bearing, $d'$, substantially as described, and for the purposes specified.

2. In combination with a swinging circular-saw frame, B, an arm, B', provided with an oscillating nut, a screw-rod, D, a bearing, $d'$, clamp-screw $f$, and nut $f'$, substantially as described, and for the purposes specified.

PAUL PRYIBIL.

Witnesses:
E. D. MACKINTOSH,
R. A. GOODCHITRY.